United States Patent
Anderson et al.

(10) Patent No.: US 6,704,707 B2
(45) Date of Patent: Mar. 9, 2004

(54) METHOD FOR AUTOMATICALLY AND DYNAMICALLY SWITCHING BETWEEN SPEECH TECHNOLOGIES

(75) Inventors: Andrew V. Anderson, Hillsboro, OR (US); Steven M. Bennett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 09/808,699

(22) Filed: Mar. 14, 2001

(65) Prior Publication Data

US 2002/0133337 A1 Sep. 19, 2002

(51) Int. Cl.[7] .................... G10L 15/00; G10L 21/00
(52) U.S. Cl. .................. 704/231; 704/246; 704/250; 704/251; 704/255; 704/270
(58) Field of Search ................ 704/231, 236, 704/243, 244, 246, 250, 251, 255, 270; 379/88.01, 88.04

(56) References Cited

U.S. PATENT DOCUMENTS

| | | | | |
|---|---|---|---|---|
| 6,014,624 A | * | 1/2000 | Raman | 704/243 |
| 6,094,476 A | * | 7/2000 | Hunt et al. | 379/88.04 |
| 6,377,662 B1 | * | 4/2002 | Hunt et al. | 379/88.01 |
| 6,385,304 B1 | * | 5/2002 | Hunt et al. | 379/88.01 |
| 6,522,726 B1 | * | 2/2003 | Hunt et al. | 379/88.04 |
| 6,539,078 B1 | * | 3/2003 | Hunt et al. | 379/88.04 |

* cited by examiner

*Primary Examiner*—Susan McFadden
(74) *Attorney, Agent, or Firm*—Marger Johnson & McCollom, PC

(57) ABSTRACT

A method for switching between speech recognition technologies. The method includes reception of an initial recognition request accompanied by control information. Recognition characteristics are determined using the control information and then a switch is configured based upon the particular characteristic. Alternatively, the switch may be configured based upon system load levels and resource constraints.

30 Claims, 2 Drawing Sheets

METHOD FOR AUTOMATICALLY AND DYNAMICALLY SWITCHING BETWEEN SPEECH TECHNOLOGIES

BACKGROUND

1. Field

This disclosure relates to speech recognition technology, more particularly for methods to utilize multiple speech technologies.

2. Background

Speech recognition technology has become more prevalent in recent times. Beyond dictation machines and speech-to-text conversion, speech can be used to navigate and give commands through several different types of systems. It is particularly attractive to highly mobile users, who may want to make travel reservations, leave messages, access e-mail and perform other tasks using any available phone. Being able to navigate these types of systems using voice commands, as well as being able to dictate text messages for electronic mail systems is very attractive.

Throughout this document, the terms 'speech recognition technology', or 'recognizer' will be used to describe the software that carries out the conversion of digital audio to text. The terms 'speech recognition systems' and 'system' will refer to systems that incorporate one or more speech recognition technology or recognizer components. In the discussions that follow, differentiation will be made between speech recognition technologies based on capabilities and performance.

Capabilities, as used here, will refer to the type of speech that the technology is capable of recognizing. This might be a very small domain, such as digits only, or a very large one, such as a large vocabulary dictation system. Performance may be measured along a number of orthogonal axes including the accuracy of conversion from speech to text, the resource requirement of the conversion process, the latency of conversion and other factors. Note that in addition to items such as computation, memory, etc., resource requirements may include items such as licenses for the recognizer used.

Current speech recognition systems typically use one type of speech technology. The system designers must select a technology based on their required system capabilities and performance and target technology capabilities, costs and performance. Inexpensive, lower capability technologies provide high accuracy in only a limited range of capabilities, but do not require large resource commitments. Midrange technologies have increased capabilities with a commensurate increased resource requirement. For speech recognition tasks that only need the lower capabilities, the system can bog down unnecessarily if higher capability recognition technologies are used, providing unneeded features. Higher requirement tasks, such as dictation, cannot obtain the desired accuracy with the lower capability technologies. High capability, high performance technologies would have the highest accuracy and widest range of tasks it can complete but may be too expensive to implement system-wide, or may require too high a level of resources for some enterprises.

Therefore, some method of using several different kinds of speech recognition technology in one system would seem helpful, as would ways to manage the utilization of these different technologies.

BRIEF DESCRIPTION OF THE DRAWINGS

The invention may be best understood by reading the disclosure with reference to the drawings, wherein.

DETAILED DESCRIPTION OF THE EMBODIMENTS

Figure 2:
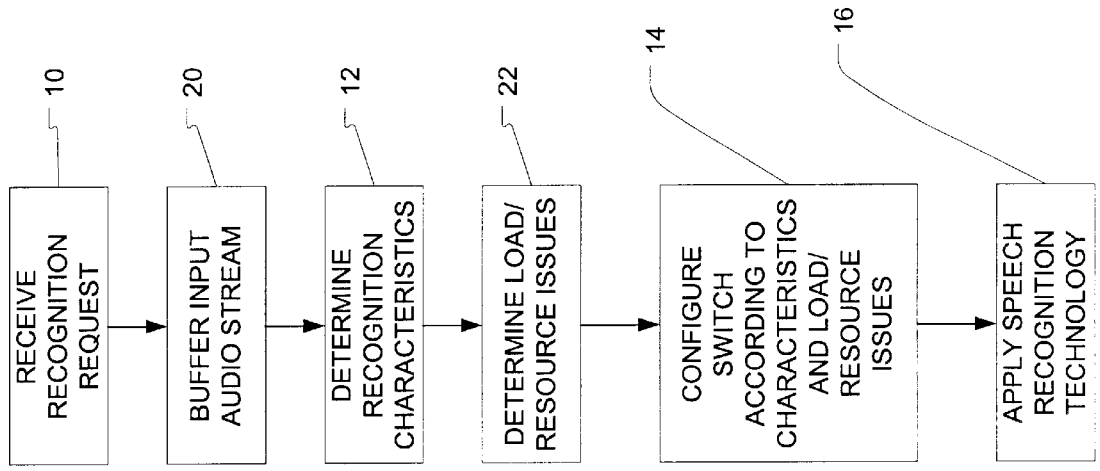
FIG. 2 shows a flowchart of an alternative embodiment of a method to switch between multiple speech technologies, in accordance with the invention.

As speech recognition systems and technologies evolve, demand for more tailored speech systems will increase. Complex speech systems often perform numerous tasks with differing capability and performance requirements. For example, a first user may only require simple voice mail retrieval, a task with very low capability requirements as the user will only need recognition of numerical choices from predefined menus. At the same time, a second user may want to dictate an e-mail using the speech system. These are two tasks that must be handled by the same speech system.

Currently, most speech systems use one type of speech recognition technology. This can result in a mismatch between the desired performance and cost and the actual performance and cost. Systems may be low cost but not have the higher level of capabilities and performance desired for some tasks. Alternatively, the system may have higher capabilities and performance than desired for some tasks, and will be less cost-effective than a system more closely matched to those particular tasks. A designer is forced either to sacrifice features and/or performance to fit in a low cost envelope, or to select a premium technology that is not cost-effective for many of the tasks.

Generally, speech recognition technology can be grouped into three different types, with the understanding that these types are not to be considered all encompassing or intended to limit application of the invention in any way. Small-domain speech recognition obtains high accuracy in a small domain of possible speech objects, such as letters and digits. It is relatively inexpensive, but has very limited application. An example of this type of speech recognition is found in Nuance Express™, from Nuance Communications, Inc.

Grammar-based speech recognition technology generally costs more, both in computational resources and in licensing costs. It supports speech recognition of phrases defined in a standard grammar but does not typically support dictation. It is optimized for high throughput so that systems can handle many simultaneous users. One such example can be found in SpeechWorks 6™, by SpeechWorks, Inc.

The most computationally intensive and most expensive speech recognition technology type is dictation. Currently, users of speaker-dependent recognition technologies must spend time 'training' their dictation packages to their voices and can then dictate directly into their computers. Speaker independent recognition technologies perform reasonably for a wide spectrum of users without this additional user burden. These packages also may have the capability of learning as the speakers pronounce new words and correct mistakes in the translation. Examples of this type of technology include ViaVioce™ by IBM, and DragonDictate™ by Dragon Systems, Inc. These examples are speaker-dependent technologies. There are currently no commercially available speaker-independent dictation-targeted recognizers, though there are a wide variety of academic and commercial research systems.

In order to provide a cost-effective solution, a company deploying a telephony-based voice portal currently must use a grammar-based recognition technology for their entire system. This limits the functions that the system can perform, eliminating the possibility of dictating email, for example. Additionally, in many places, a less capable recognition technology would be sufficient to implement the voice portal. This can result in extra expense, both in terms of licensing costs and computational requirements.

For example, there may be desire for a voice system that allows users to navigate through voice mail messages and dictate e-mails. As the user first enters the system, login and PIN-based user authentication will require only letter and digit recognition. Using grammar-based speech recognition technology as described above for these simpler tasks is a waste of capabilities and more expensive than it needs to be. The approach also provides less accuracy than would be possible using a more domain specific recognition technology.

Navigation of email can be performed effectively using the grammar based speech recognition technology. Tasks such as email dictation are simply not possible using grammar-based technologies. It must be noted that the description using these particular terms for speech recognition technology is only intended as an example and is in no way intended to limit application of the invention.

Figure 1:
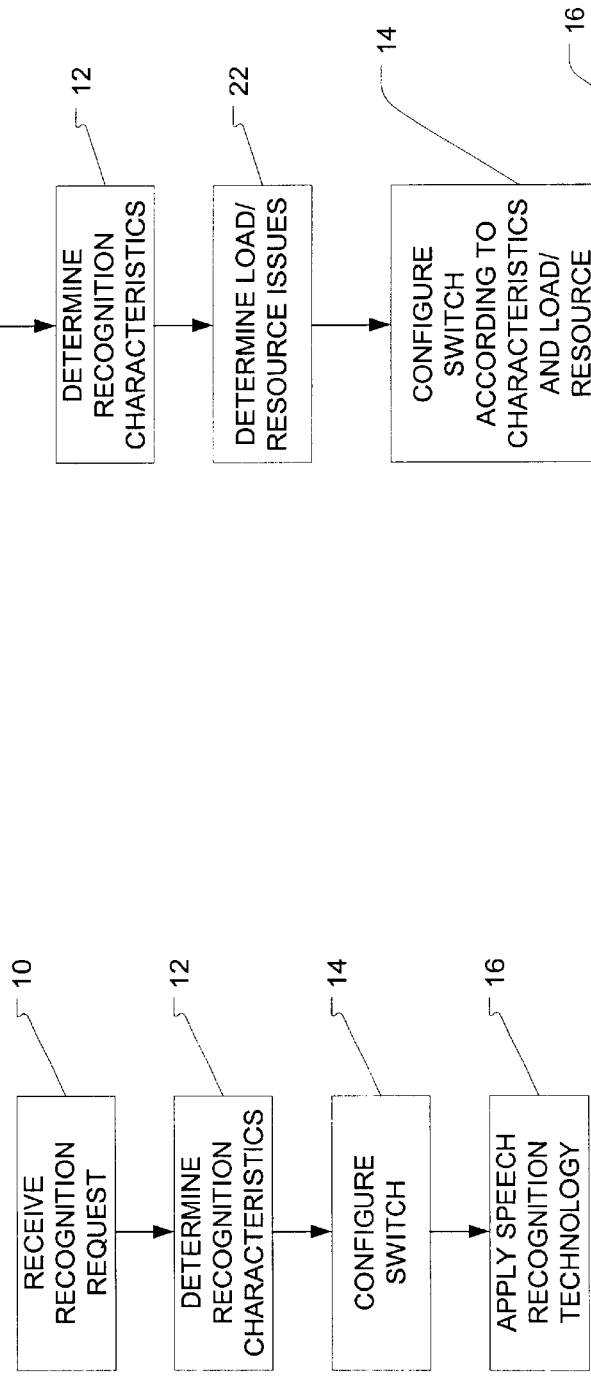
FIG. 1 shows a flowchart of one embodiment of a method to switch between multiple speech technologies, in accordance with the invention.

FIG. 1 shows a flowchart for one embodiment of a method to employ multiple speech recognition technologies and switch between them as necessary. At 10, the recognition request is received. Accompanying the recognition request will be control information, either within the recognition request or in a separate path, as will be discussed later. Once the request is received, the recognition characteristics are determined at 12 using the control information as well as other aspects of the request.

Recognition characteristics are those aspects of the recognition request that can be used to direct and manage the request. The characteristics identify the type of task desired by the user, such as dictation, alphanumeric conversion, or grammar-based command and control. The system uses the characteristics to match the request to the recognizer with the appropriate attributes. As will be discussed further, this may also be affected by the current system load balance. Recognition characteristics include the type, such as alphanumeric digits, command/control grammars, freeform entry; priority, such as the importance of the task or the service level of the user; and control information for the recognition engines, such as grammars, language models, dictionaries, etc. A switch that will route the request to a particular recognition engine and return the results to the requester will then be configured at 14. Finally, the speech recognition technology residing in the selected recognition engine will be applied at 16 and the results returned to the requester.

For purposes of discussion, and not with any intention of limiting application of the invention, assume a user accesses a voice-activated system using a telephone. The user may log in using a spoken numeric user id and personal identification number (PIN). The small-domain speech recognition technology may be used for this task. Once the user has logged in, the system may switch the input stream of that recognition request to a higher-level speech recognition technology, for example, the grammar-based technologies mentioned above. This may allow the user to navigate through the site using specific command words and phrases. If the user's commands indicate a desire to dictate an e-mail or some other sort of dictation task, the recognition engine for dictation would then be applied. The control signals may be generated from the system as the characteristics of the incoming speech changes.

This embodiment of the invention provides the speech system with expanded functionality, in this case the ability to use dictation technology within the framework traditionally utilizing only a grammar-based speech technology.

Alternative embodiments of this method may address other issues. For example, the speech recognition system may have system load balancing features. As an example, a speech recognition system having two different types of speech recognition engines is assumed. The first offers moderate accuracy with low computation requirements, and the second offers high accuracy with substantial computational requirements. Both target the same domain, offering the same capabilities at substantially different performance levels. A single server may handle dozens of concurrent users for the first technology, but only a few for the second.

The first customers on an idle system such as the one described in this example may be served using the more accurate technology. As the number of concurrent users increases past a given threshold, new users would be directed to the less accurate technology. If the number of users reaches a second threshold, users accessing the more accurate technology may be migrated to the less expensive and less computationally intensive technology to increase system capacity. Additionally, users may have a priority assigned to them, based upon the service level subscribed to by the user or some other factor, such as the importance or potential value of the task at hand. This priority can also be used to determine which users are assigned to which technologies.

It must be noted that less accurate technologies could also include less accurate levels of the same type, such as small domain, grammar-based, or dictation. For example, Dragon Systems has several different levels of complexity in their Dragon Dictate™ products, such as a professional package as well as variations targeted to the terminology-intensive areas of medical and legal dictation. Users in the above example of a higher level of dictation technology may also be migrated to other dictation technologies that are not as accurate or do not have as many features as their currently assigned technology.

Additional factors may affect the configuration of the switch and the subsequent application of speech technology. For example, the characteristics of the recognizer engine employing a level of speech technology may be used. These characteristics include capability information, performance information, accuracy and cost information. Cost information may include the licensing costs, as will be discussed below.

A flow chart of one embodiment similar to the scenario discussed above is shown in FIG. 2. In this example, new processes are inserted into a flow similar to that shown in FIG. 1. For example, the input audio stream may be buffered to allow smooth migration from one technology or server to another, as well as the handling of several requests received simultaneously. Requests not being processed immediately would be buffered until the system could acknowledge that request. Additionally, the buffer allows the speech-recognition engines to be time-shared. As an example, buffering is shown being accomplished just after the reception of the request. The placement of these additional processes in FIG. 2 are only intended as an example and are not intended to limit application of the invention.

In addition to utilizing recognition characteristics to configure the switch, this embodiment also monitors resource constraints and system load levels at 22 and configures the switch accordingly at 14. An alternative embodiment may monitor the resources constraints and/or system load levels at 22 on an ongoing basis, perhaps in a separate process independent of the arrival of recognition requests. If this process finds load or resource balancing issues, the switch may be reconfigured to route existing audio streams to use different speech technologies. The resource constraints of the system in conjunction with the current load will determine the course of action taken by the system. At least one of these factors will be used in configuring the switch.

The resource constraints monitored include such things a computational intensity and accuracy, as mentioned above. Also, cost of licensing a particular technology may also be considered a resource constraint. Two different types of speech recognition technologies may have comparable computational intensity and accuracy, but one may cost more per use than the other. If both technologies were available, it may be more desirable for the system to use the less expensive technology, using cost as a resource constraint.

Additionally, as mentioned above, the load balancing may switch a user whose audio stream is already being processed to another technology, referred to as an acknowledged stream. In this case, the act of 'receiving a recognition request' may mean that the system is receiving requests generated for the new data in the acknowledged stream, rather than an audio stream from a new user. The above examples are merely demonstrations of application of the invention and are not intended to limit the scope of the invention.

A user's priority code, mentioned above, might also be used to determine to what technology a user is initially assigned. After the system becomes loaded and rebalancing is required, the user's priority may also be used to determine to what recognizer the user's stream is switched, if any.

These tasks will likely be handled by software loaded onto a general system architecture having some sort of processor, such as a digital signal processor, general use central processing unit or controller, all of which would be included in the term processor. In this embodiment of the invention, the method of the invention would be implemented on some sort of article having stored software instructions that, when executed by a processor, would result in the tasks of the invention.

Figure 3:
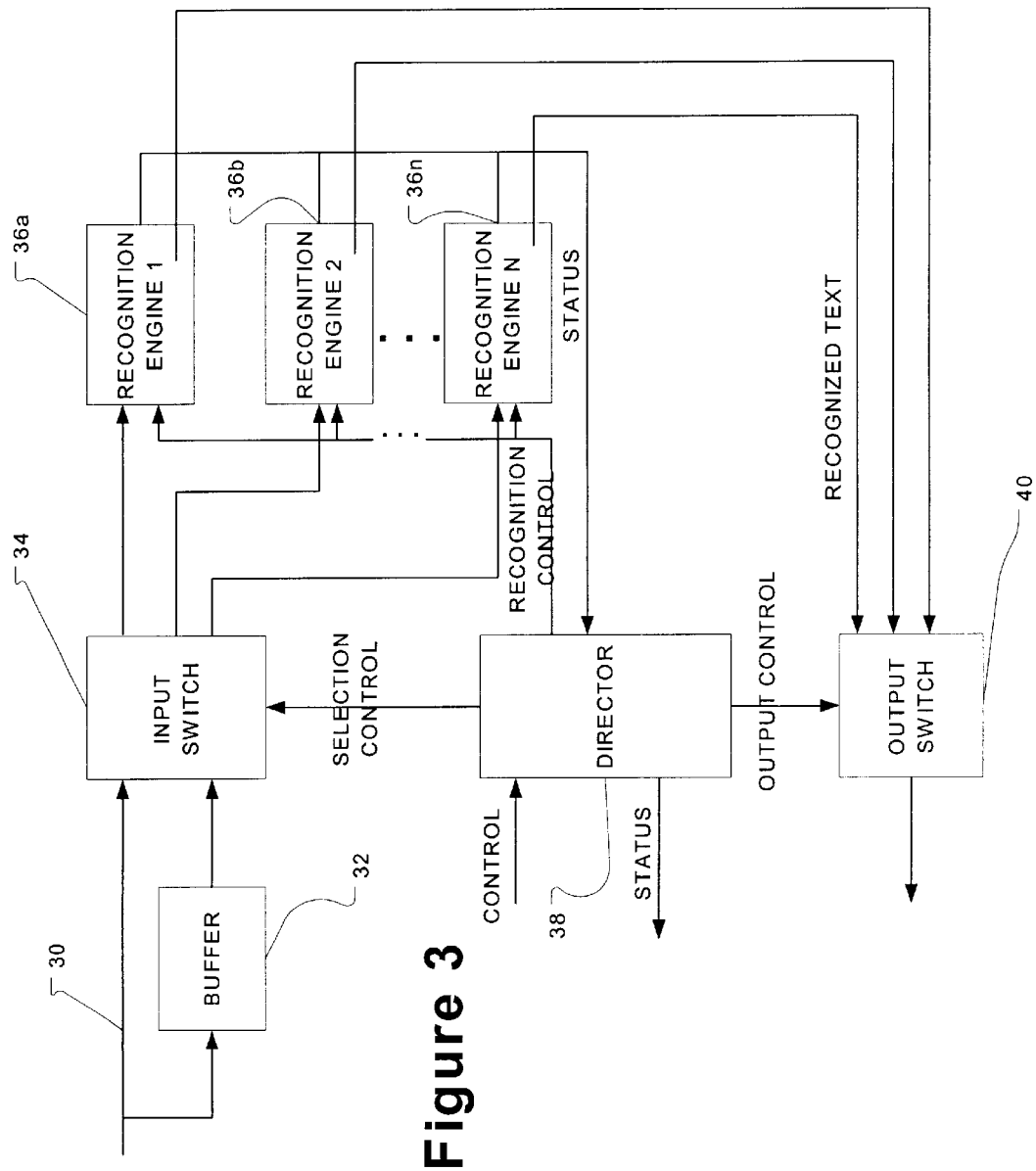
FIG. 3 shows a block diagram of one embodiment of an architecture for a speech recognition switching circuit, in accordance with the invention.

An example of such a system is shown in FIG. 3. The input audio stream 30 enters the system at the input switch 34. As mentioned above, buffer 32 may buffer it. Control signals accompanying the input audio stream are received by a director module 38, which has the responsibility of setting the input switch 34 to direct the audio stream to the appropriate recognition engine. The recognition engines 36a through 36n will have engines for at least two different speech technologies. There may also be redundant engines for each technology. The recognition engines may pass a status signal back to the director, which may in turn provide status of each recognition session to other parts of the system or to the user.

Once the selected recognition engine processes a given input audio signal, the output text is returned to the other parts of the system, such as to an e-mail manager as an example. The output text may be handled by an output switch 40, which, in cooperation with the input switch 32, facilitates multitasking by the recognition engines to handle more than one input audio stream at a time. The director module 38 is responsible for setting the output switch 40 appropriately to route the results from the correct recognizer to the other parts of the system.

The switches 34 and 40 are shown in the diagram of FIG. 3 as being separate switches. In practice, these may actually be the same switch. In that case, the functionalities of taking multiple speech requests and routing them to the appropriate technology and taking multiple output streams and routing them to the appropriate user would be accomplished on the same device.

In this manner, several speech technologies may be used in one speech recognition system. This has advantages for the users, as mentioned above, as well as for system management.

Thus, although there has been described to this point a particular embodiment for a method and apparatus for using multiple speech technologies in one speech recognition system, it is not intended that such specific references be considered as limitations upon the scope of this invention except in-so-far as set forth in the following claims.

What is claimed is:

1. A method for switching between speech recognition technologies, the method comprising:
    a) receiving a recognition request, wherein the recognition request is accompanied by control information;
    b) determining recognition characteristics of the recognition request using the control information;
    c) configuring a switch based upon the recognition characteristics; and
    d) applying a speech recognition technology determined by the configuration of the switch.

2. The method of claim 1, the method further comprising monitoring at least one of resource constraints and load levels and configuring a switch is also based upon at least one of the resource constraints and load levels.

3. The method of claim 2, the method further comprising reconfiguring the switch as necessary based upon at least one of the resource constraints and load levels after the initial application of a speech technology.

4. The method of claim 3, wherein the method further comprises buffering signals from the recognition request and voice data prior to configuring the switch.

5. The method of claim 1, wherein the method is applied to several recognition requests received by the system at substantially the same time.

6. The method of claim 1, wherein the control information includes a priority rating usable to determine the speech technology to apply.

7. The method of claim 1, wherein the request is from a new audio stream.

8. The method of claim 1, wherein the request is from new data in an acknowledged audio stream.

9. The method of claim 1, wherein configuring a switch is also based upon recognizer characteristics.

10. An article containing software instructions that, when executed, result in:
    a) reception of a recognition request, wherein the recognition request is accompanied by control information;
    b) determination of recognition characteristics of the recognition request using the control information;
    c) configuration of a switch based upon the recognition characteristics; and
    d) application of a speech technology determined by the configuration of the switch.

11. The article of claim 10, the article further including instructions that, when executed, result in monitoring at least one of resource constraints and load levels and configuring a switched based upon at least one of the resource constraints and load levels.

12. The article of claim 10, wherein the instructions are executed for several recognition requests received by the system at substantially the same time.

13. The article of claim 10, wherein the control information includes a priority rating usable to determine the speech technology to apply.

14. The article of claim 10, the article further including instructions that, when executed, result in reconfiguration of the switch as necessary based upon at least one of resource constraints and load levels after a speech technology has been applied.

15. The article of claim 10, wherein the article further includes instructions that, when executed, results in buffering of signals from the recognition request and voice data prior to reconfiguring the switch.

16. A speech recognition manager, comprising:
   a) a control module operable to receive input audio streams and indicate recognition characteristics of the input audio streams;
   b) a director operable to receive control information accompanying the input audio stream;
   c) a switch operable to direct the input audio streams in accordance with configuration instructions from the director; and
   d) at least two recognition engines operable to receive an input audio stream from the switch when the switch is configured to direct the stream to that recognition engine, and to perform speech conversion.

17. The manager of claim 16 wherein the manager further comprises an output switch operable to select between at least two output streams from the recognition engines.

18. The manager of claim 16, wherein the at least two recognition engines further comprises an array of recognition engines.

19. A method for switching between speech recognition technologies, the method comprising:
   a) receiving a recognition request;
   b) monitoring at least one of resource constraints and system load levels;
   c) configuring a switch based upon at least one of the resource constraints and system load levels; and
   d) applying a speech recognition technology determined by the configuration of the switch.

20. The method of claim 19, wherein the request is from a new audio stream.

21. The method of claim 20, wherein a priority code accompanying the request is used in configuring the switch.

22. The method of claim 19, wherein monitoring at least one of the resource constraints and system load levels is an ongoing process.

23. The method of claim 19, wherein the method is applied to several recognition requests received by the system at substantially the same time.

24. The method of claim 19, wherein the method further comprises buffering signals from the recognition request and voice data prior to configuring the switch.

25. The method of claim 19, wherein the request is from new data in an acknowledged audio stream.

26. The method of claim 21, wherein a priority code accompanying the request is used in configuring the switch.

27. The method of claim 19, wherein configuring the switch is also based upon recognizer characteristics.

28. An article containing software instructions that, when executed result in:
   a) reception of a recognition request;
   b) monitoring at least one of resource constraints and load levels;
   c) configuring a switched based upon at least one of the resource constraints and system load levels; and
   d) applying a speech recognition technology determined by the configuration of the switch.

29. The article of claim 28, wherein the request is from a new audio stream.

30. The article of claim 28, wherein the request is from new data in an acknowledged audio stream.

* * * * *